United States Patent
Gangopadhyay

(10) Patent No.: US 7,178,507 B1
(45) Date of Patent: Feb. 20, 2007

(54) ENGINE CYLINDER-TO-CYLINDER VARIATION CONTROL

(75) Inventor: Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/263,173

(22) Filed: Oct. 31, 2005

(51) Int. Cl.
*F02M 7/00* (2006.01)
(52) U.S. Cl. .................... 123/435; 123/27 R
(58) Field of Classification Search ............ 123/435, 123/436, 27 R
See application file for complete search history.

(56) References Cited

U.S. PATENT DOCUMENTS 7,073,485 B2 * 7/2006 Truscott et al. ........ 123/406.22
2005/0039721 A1 * 2/2005 Truscott et al. ........ 123/406.22

* cited by examiner

*Primary Examiner*—Noah P. Kamen
(74) *Attorney, Agent, or Firm*—Kathryn A. Marra

(57) ABSTRACT

A control system and method for balancing output and exhaust emission values of the various cylinders of an engine having individual cylinder fuel delivery control. Selected output and emission related values for one cylinder, selected as a base cylinder, are compared to the same values for the other cylinders, and fuel injection quantity and timing (or another combustion phasing variable) are adjusted in the other cylinders to output and emission values of the base cylinder. The adjustments are weighted based on the degree to which changes in both the injection quantity and timing (or other variable) influence changes in both the output and emission values as determined from the sensed readings of pressure sensors in each of the cylinders.

8 Claims, 1 Drawing Sheet

ENGINE CYLINDER-TO-CYLINDER VARIATION CONTROL

TECHNICAL FIELD

This invention relates to balancing of cylinder-to-cylinder variations in engines, such as diesel engines, using cylinder pressure based feedback and multivariable control.

BACKGROUND OF THE INVENTION

In a direct injection (DI) diesel engine, there is often a significant spread in the fuel injector hardware from cylinder-to-cylinder. This causes significant variations in how much fuel is actually injected in the various engine cylinders. There are also significant variations in how much recirculated exhaust gas (EGR) is trapped in the various cylinders due to variations in EGR distribution in the intake manifold. This results in variations in ignition delay for the various cylinders which, in turn, cause combustion events to be timed and phased differently between the cylinders. These differences result in producing different work outputs or indicated mean effective pressures (IMEP) from the various cylinders, as well as differing levels of emission products, such as nitrogen oxides (NOx), particulates (PM), hydrocarbons (HC) and carbon monoxide (CO), etc.

There are also variations in actual compression ratio between cylinders which cause differences in efficiency of combustion and thus a difference in IEMP produced by each cylinder. In addition, fuel quality differences from one fill-up to the next also may cause the engine to run differently.

Current state-of-the-art diesel engine controls try to address these problems by calibrating the engine actuators (injection timing, EGR and turbo charger boost pressure) for the worst cylinder and by having significant engineering margins in the cylinder calibration. IMEP/torque differences between cylinders due to the injectors are also addressed at idle by analyzing engine speed fluctuations at the relatively constant idle operating point. State-of-the-art controls do not have the capability to identify the complex combinations of different sources of variation causing cylinders to produce varying power and emissions. Thus, if EGR differences or air differences are causing smoke and $NO_x$ differences, and also cause IMEP's to differ in various cylinders, injector fuel quantity trims will be used to fix the problem, although that is not the source of the problem. Similarly, if fuel quantity differences cause variations in ignition delay, only timing will be used to adjust for the start of ignition, although that is not the problem.

SUMMARY OF THE INVENTION

The present invention provides a multi-variable approach to solving the problem of cylinder-to-cylinder variation by adjusting fuel injection quantity and timing to place all the cylinders in balance of key power and emission values all the time in the presence of EGR, air, fuel, compression ratio, and other cylinder efficiency related variations. Preferably, the method uses cylinder pressure based feedback to adjust selected engine variables and obtain or approximate the desired balance.

For example, cylinder pressure signals can be used to compute first variables, such as individual cylinder IMEP, or ratios of IMEP from one cylinder to another. The cylinder pressure signals can also be used to compute second variables, such as start of combustion (SOC), ignition delay (ID) or location of peak pressure (LPP) or, in a more advanced implementation, some characteristic parameter that relates to combustion phasing, such as heat release rate shape with crank angle or percent mass fraction of burned fuel with crank angle ($MFB_{XX}$).

These two feedback signals are then used to adjust fuel quantity and injection timing for each cylinder, thereby maintaining set-points for IMEP and SOC (or ID, LPP, heat release shape or $MFB_{XX}$) for each cylinder. Ultimately the objective is to balance the cylinders to the same set-points that are generated through a conventional calibration process for the engine.

Use of the combustion timing or phasing related parameters, results in set-point look up tables that are functions of speed and fuel (or torque). For an IMEP related parameter, no special set-points are generated as balancing automatically means that the ratio of power is always adjusted to one between compared cylinders. Any specific cylinder can be chosen as a basis for comparison with the others.

In carrying out of the method, feedback from the IMEP ratio computer, for example, is applied through separate controllers to adjust both the fuel quantity and injection timing values in the ratio in which engine operation indicates that changes in the IMEP ratio affects these values. Similarly, feedback from the SOC computer (or ID, LPP, heat release shape or $MFB_{XX}$) is applied to both values in proportion to its calculated effects on the values.

These and other features and advantages of the invention will be more fully understood from the following description of certain specific embodiments of the invention taken together with the accompanying drawings.

BRIEF DESCRIPTION OF THE DRAWINGS

The single FIGURE of the drawing is a schematic diagram indicating an exemplary control system adapted for carrying out the control method of the present invention.

DESCRIPTION OF THE PREFERRED EMBODIMENT

Figure 1:
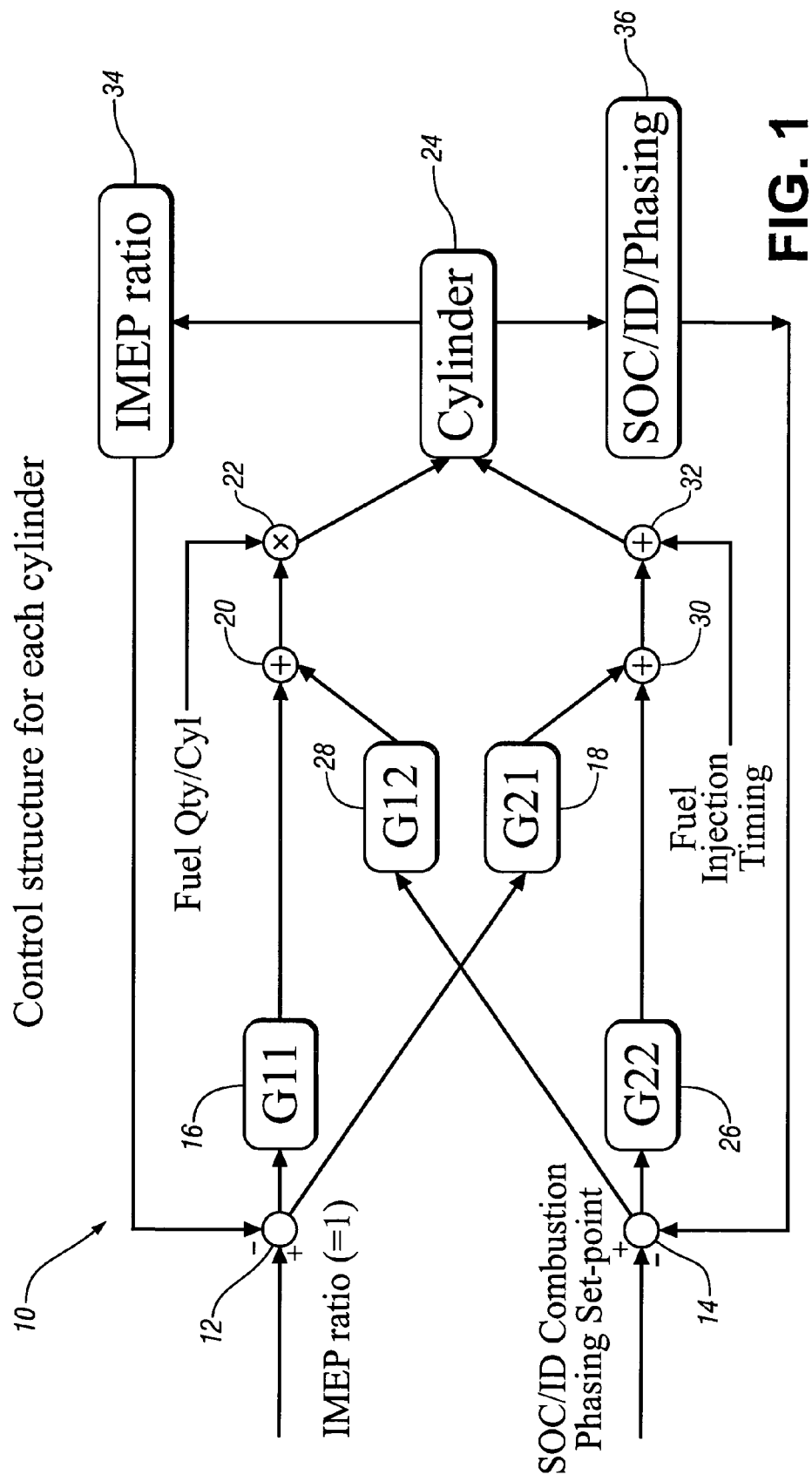

Referring now to the drawing in detail, numeral 10 generally indicates an exemplary control system for carrying out one embodiment of a control method according to the invention. System 10 includes two separate set-points, a first set-point 12 for IMEP ratio and a second selected phasing set-point 14, such as start of combustion (SOC) (or other phasing variables, auch as ID—ignition delay, LPP—location of peak pressure, heat release shape, or $MFB_{XX}$—percent mass fraction of burned fuel). Set-point 12 communicates with two proportional integral (PI) controllers, an IMEP controller 16 and a SOC controller 18, assuming SOC is the phasing variable.

Controller 16 connects at a summation point 20 where signals are added, as will be noted later. Point 20 further connects with a multiplying point 22 where fuel quantity per cylinder is combined with the signals from the summation point 20. The result is used for each engine cylinder 24 to control the fuel injector to inject the proper quantity of fuel.

The SOC set-point 14 similarly connects with two PI controllers, an SOC controller 26 and an IMEP controller 28. SOC controller 26 connects at a summation point 30, which in turn connects with an additional summation point 32, where a fuel injection timing signal is modified by the combined signal from point 30. Point 32 in turn connects with each engine cylinder 24 and acts to control the timing of fuel injection in each of the cylinders separately. Pressure sensors in the various cylinders connect with computers 34, 36, which individually compute the IMEP ratio and SOC timing, respectively, of each cylinder combustion event.

The IMEP computer 34 sends actual IMEP information, as feedback, to the IMEP set-point 12 while the SOC computer 36 sends back the actual start of combustion information to the SOC set-point 14. The IMEP information is compared with an input ratio of 1 for the base cylinder to which the other cylinders are compared. The base signal is modified by input from the IMEP computer to generate an error signal e. Similarly, the SOC computer 36 feeds back actual start of combustion information to the SOC set-point 14 where the desired phasing value is received and combined with the actual SOC value to determine a second error signal $e_2$.

In operation, each variable of the cylinder operation is modified by the system 10 using a weighted combination of the feedback results from both the IMEP and SOC computers 34, 36 in order to provide an additive error signal that adjusts a subsequent combustion event to correct errors in both the IMEP and SOC feedback results. Specifically, summation point 20 receives error adjusted information from PI controllers 16 and 28, providing a combination of feedbacks from the IMEP ratio computer 34 and SOC timing computer 36. These summed values at 20 are, as previously indicated, fed to the multiplying point 22 and direct adjustments to the injectors to vary the fuel quantity in a manner to bring the cylinder IMEP closer to the desired IMEP ratio of 1. Similarly, summation point 30 receives signals from the SOC controller 26 and the IMEP controller 18, which combine errors signals from the SOC computer 36 and IMEP computer 34 to adjust the start of injection timing at point 32 to bring injection timing closer to the desired value in a subsequent cylinder combustion event.

The control system continuously monitors cylinder IMEP ratio and start of combustion timing for each cylinder and feeds back the information to the various PI controllers 16, 18, 26, 28 to modify the fuel injection quantity and timing in order to obtain the desired set-points for IMEP and SOC, which will balance each of the cylinders to produce the same output as the initially tested base cylinder. The base cylinder may be any cylinder of the engine desired for use as a base to which the other cylinders are adjusted.

To determine IMEP for the various cylinders, knowledge of the actual cylinder pressures determined from cylinder pressure indicators would be helpful. The following calculations would be applicable:

Cylinder pressure sensor voltage $E = gP + e$

Where:
g is the sensor gain (volts/kPa)
P is the cylinder pressure (kPa)
e is the offset voltage (volts)
E is the output of the charge amplifier (volts)

IMEP for one cylinder is defined as the integral of Pdv along the P-V diagram where dv refers to volume differential $$IMEP = \frac{1}{4\pi} \oint P dv$$

However, conventional pressure sensors that could be used for measuring the cylinder pressures would inherently have slightly differing gain and offset voltage values, which would not be known unless determined by previous testing at excessive cost. Thus, the cylinder pressures could not be accurately calculated from the sensor voltages. Nevertheless. balancing of the cylinder outputs can be accomplished through determination of the IMEP ratios without knowing the actual cylinder pressures The following optional method is suggested for determining the necessary values.

IMEP Ratio Calculation

If we are only interested in the ratio of IMEPs in two cylinders, then the integral could be calculated with Edv as the integrand in the following way.

$$\frac{IMEP_x}{IMEP_1} = \frac{g_1}{g_x} \frac{\oint (E_x - e_x) dv}{\oint (E_1 - e_1) dv} = \frac{g_1}{g_x} \frac{\oint E_x dv}{\oint E_1 dv}$$

The latter simplification is a result of the fact that $\oint edv = e \oint dv = 0$ (which means that offset in cylinder pressure acquisition does not affect IMEP calculation, a well known fact).

The offset 'e' can be estimated by algorithms that use the isentropic assumption of $Pv^n$=constant.

The pressure in each cylinder at an early crank angle like BDC (bottom dead center) or IVC (intake valve closure) should be roughly the same and thus the ratio of sensor gains can be calculated as $$\frac{g_1}{g_x} = \frac{E_1(CA) - e_1}{E_x(CA) - e_x}$$

where CA (crank angle) refers to a chosen crank angle (e.g. IVC or BDC). We can thus get the ratio of IMEPs in cylinders without needing the knowledge of sensor gains.

While the present invention has been described as applied primarily to engines having direct injection of fuel into individual engine cylinders, such as diesel and gasoline engines, the invention may equally well be applied to engines using other fuels or having other forms of individual cylinder fuel delivery and/or control.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A cylinder balance control system for an engine having control of fuel delivery to individual cylinders of the engine, the system comprising:

a cylinder pressure sensor connected to each engine cylinder and operative to feed cylinder pressure information to a first computer and a second computer;

the first computer being operative to compute and supply cylinder output information to an engine set-point for combining with a desired output value to obtain an output error signal;

the second computer being operative to compute and supply cylinder combustion phasing information to a phasing set-point for combining with a desired phasing value to obtain a phasing error signal;

first and second PI controllers connected to receive the output error signals and supply correlated output and phasing values, respectively, to first and second summation points;

third and fourth PI controllers connected to receive the phasing error signals and supply correlated phasing and output values, respectively, to the first and second summation points;

the first summation point being operative to combine output values from the first and fourth PI controllers and compare them with base fuel quantity signals to determine an adjusted fuel quantity for delivery to each respective engine cylinder; and the second summation point being operative to combine output values from the second and third PI controllers and compare them with base start of combustion timing signals to determine an adjusted timing for delivery of fuel into each respective engine cylinder.

2. A system as in claim 1 wherein the fuel delivery is by direct cylinder injection.

3. A system as in claim 2 wherein the engine is a diesel engine.

4. A method for improving balance of engine output and exhaust emission values between cylinders of an engine having individual cylinder fuel delivery control, the method comprising:

determining base set-points of selected output and phasing values to be reached by each of the cylinders of the engine;

operating the engine at a selected speed with fuel delivery quantity and timing based on the determined set points;

converting cylinder pressure information from sensors connected with each of the cylinders to load and phasing feedback signals and comparing the feedback signals with the load and phasing set-point values to obtain error signals;

calculating the degree to which changes in the output and phasing error signals for each cylinder were affected by changes in the cylinder phasing and output values, respectively; and adjusting the fuel delivery quantity and timing for each cylinder in proportion to the weighted effects of the error signals to obtain corrected quantity and timing values that more closely provide the desired set-point values for each engine cylinder.

5. A method as in claim 4 wherein the step of converting cylinder pressure information includes determining a ratio of sensor gains, at an early crank angle at which the pressures should be equal, according to the formula:

$$\frac{g_1}{g_x} = \frac{E_1(CA) - e_1}{E_x(CA) - e_x}$$

where CA (crank angle) refers to a chosen crank angle in a range of crank angles extending from piston bottom dead center (BDC) to intake valve closing (IVC).

6. A method as in claim 5 wherein the converting step further includes calculating IMEP ratios of pairs of engine cylinders in accordance with the equation:

$$\frac{IMEP_x}{IMEP_1} = \frac{g_1}{g_x} \frac{\oint (E_x - e_x)dv}{\oint (E_1 - e_1)dv} = \frac{g_1}{g_x} \frac{\oint E_x dv}{\oint E_1 dv}$$

where dv refers to the volume differential.

7. A method as in claim 4 wherein the fuel delivery is by direct cylinder injection.

8. A method as in claim 7 wherein the engine is a diesel engine.

* * * * *